United States Patent
Lv (10) Patent No.: US 11,822,788 B2
(45) Date of Patent: Nov. 21, 2023

(54) DATA STORAGE MANAGEMENT METHOD AND APPARATUS, AND COMPUTER-READABLE STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Suna Lv, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD, Beijing (CN)

( * ) Notice: Subject to any disclaimer, the term of this patent is extended or adjusted under 35 U.S.C. 154(b) by 243 days.

(21) Appl. No.: 17/432,815

(22) PCT Filed: Feb. 3, 2020

(86) PCT No.: PCT/CN2020/074191
§ 371 (c)(1),
(2) Date: Aug. 20, 2021

(87) PCT Pub. No.: WO2020/186931
PCT Pub. Date: Sep. 24, 2020

(65) Prior Publication Data
US 2022/0121372 A1    Apr. 21, 2022

(30) Foreign Application Priority Data

Mar. 15, 2019  (CN) .......................... 201910197865.4

(51) Int. Cl.
*G06F 3/06* (2006.01)
*G06F 16/215* (2019.01)
*G06F 16/28* (2019.01)

(52) U.S. Cl.
CPC .......... *G06F 3/0608* (2013.01); *G06F 3/0644* (2013.01); *G06F 3/0653* (2013.01);
(Continued)

(58) Field of Classification Search
None
See application file for complete search history.

(56) References Cited

U.S. PATENT DOCUMENTS

2010/0161780 A1* 6/2010 Lee ..................... H04L 67/1097
709/223
2013/0339643 A1* 12/2013 Tekade .................. G06F 16/215
711/162

(Continued)

FOREIGN PATENT DOCUMENTS

CN    101777028 A    7/2010
CN    103607312 A    2/2014
(Continued)

OTHER PUBLICATIONS

"First Office Action and English language translation", CN Application No. 201910197865.4, dated Feb. 24, 2021, 14 pp.
(Continued)

*Primary Examiner* — Charles Rones
*Assistant Examiner* — Jonah C Krieger
(74) *Attorney, Agent, or Firm* — Myers Bigel, P.A.

(57) ABSTRACT

This disclosure relates to a data storage management method and apparatus, and a computer-readable storage medium, and to the technical field of data storage. The method of the present disclosure includes: acquiring the number of accesses of a data storage unit in a big data cluster within a
(Continued)

corresponding preset time interval; determining whether the data storage unit belongs to a to-be-destroyed storage unit according to the number of accesses of the data storage unit in the corresponding preset time interval; and issuing a to-be-destroyed prompt under the condition that the data storage unit belongs to a to-be-destroyed storage unit.

17 Claims, 3 Drawing Sheets

(52) U.S. Cl.
CPC .......... *G06F 3/0683* (2013.01); *G06F 16/215* (2019.01); *G06F 16/283* (2019.01)

(56) References Cited

U.S. PATENT DOCUMENTS

| | | | |
|---|---|---|---|
| 2019/0079861 A1* | 3/2019 | Amaki | G11C 29/42 |
| 2019/0163795 A1* | 5/2019 | Lai | G06F 16/221 |

FOREIGN PATENT DOCUMENTS

| | | | |
|---|---|---|---|
| CN | 104715020 A | 6/2015 | |
| CN | 107168654 A | 9/2017 | |
| CN | 107346321 A | 11/2017 | |
| KR | 20100072770 A | 7/2010 | |

OTHER PUBLICATIONS

"International Search Report with English language translation", International Application No. PCT/CN2020/074191, dated May 8, 2020, 6 pp.

* cited by examiner

Fig. 6

DATA STORAGE MANAGEMENT METHOD AND APPARATUS, AND COMPUTER-READABLE STORAGE MEDIUM

CROSS-REFERENCE TO RELATED APPLICATIONS

The present application is a 35 U.S.C. § 371 national stage application of PCT Application No. PCT/CN2020/074191, filed on Feb. 3, 2020, which itself is based on and claims the priority to the Chinese Patent Application No. 201910197865.4, filed on Mar. 15, 2019, the disclosures of which are hereby incorporated in their entireties into the present application. The above-referenced PCT International Application was published in the Chinese language as International Publication No. WO 2020/186931 A1 on Sep. 24, 2020.

TECHNICAL FIELD

The present disclosure relates to the technical field of data storage, and in particular, to a data storage management method and apparatus, and a computer-readable storage medium.

BACKGROUND

With the development of the Internet technology, data are growing explosively. The data can be stored in a big data cluster or data warehouse, and a user can perform operations such as query, addition and deletion thereon.

Currently, as the amount of data increases, staff may screen the data according to actual needs and delete some unnecessary data storage units.

SUMMARY

Inventors have founded that: data screening by staff will be slow and laborious and may cause accidental deletion, and when certain historical data are utilized by data developers for development, the data may be deleted due to space, which brings difficulties to development by the developers. Without storage management and data deletion, data storage units will get fatter and fatter over time, and data query speed becomes slower.

One of technical problems to be solved by the present disclosure is: how to effectively manage data storage to improve the efficiency of data storage management.

According to some embodiments of the present disclosure, there is provided a data storage management method comprising: acquiring the number of accesses of a data storage unit in a big data cluster within a preset time interval corresponding to the data storage unit, wherein the data storage unit comprises a data table or partition file; determining whether the data storage unit belongs to a to-be-destroyed storage unit according to the number of accesses; and issuing a to-be-destroyed prompt under the condition that the data storage unit belongs to a to-be-destroyed storage unit.

In some embodiments, the acquiring the number of accesses of a data storage unit in a big data cluster within a preset time interval corresponding to the data storage unit comprises: periodically querying last access time of the data storage unit; updating a record of the number of accesses according to a change of the last access time of the data storage unit; and determining the number of accesses according to the record of the number of accesses.

In some embodiments, the acquiring the number of accesses of a data storage unit in a big data cluster within a preset time interval corresponding to the data storage unit comprises: under the condition that the data storage unit is a data table, according to a time phase in which the data table lies, acquiring the number of accesses of the data table within a preset time interval corresponding to the time phase, wherein the data table is set with a lifecycle that is divided into a plurality of time phases.

In some embodiments, the acquiring the number of accesses of a data storage unit in a big data cluster within a preset time interval corresponding to the data storage unit comprises: under the condition that the data storage unit is a partition file, periodically acquiring the number of accesses of the partition file within a preset time interval corresponding to a current cycle.

In some embodiments, the determining whether the data storage unit belongs to a to-be-destroyed storage unit according to the number of accesses comprises: under the condition that the data storage unit is a data table, acquiring a first access number threshold corresponding to the time phase according to the time phase in which the data table lies; and under the condition that the number of accesses is less than or equal to the first access number threshold, determining that the data table belongs to a to-be-destroyed storage unit; wherein the first access number threshold corresponding to a different time phase is the same or different.

In some embodiments, the determining whether the data storage unit belongs to a to-be-destroyed storage unit according to the number of accesses comprises: under the condition that the data storage unit is a partition file and the number of accesses is less than or equal to a second access number threshold, determining that the partition file belongs to a to-be-destroyed storage unit.

In some embodiments, the method further comprises: according to the number of accesses of the data table within the preset time interval corresponding to the time phase, distributing the data table to a different storage device for storage.

In some embodiments, the distributing the data storage unit to a different storage device for storage comprises: comparing the number of accesses of the data table within the preset time interval corresponding to the time phase with a plurality of access number thresholds corresponding to the time phase, to determine a data popularity level of the data table; and distributing the data table to a storage device with a performance corresponding to the data popularity level for storage, according to the data popularity level of the data table.

In some embodiments, the method further comprises: under the condition that the data storage unit does not belong to a to-be-destroyed storage unit and its lifecycle reaches an end time point, reconfiguring the lifecycle.

According to other embodiments of the present disclosure, there is provided a data storage management apparatus comprising: an access number acquisition module, configured to acquire the number of accesses of a data storage unit in a big data cluster within a preset time interval corresponding to the data storage unit, wherein the data storage unit comprises a data table or partition file; a state determination module, configured to determine whether the data storage unit belongs to a to-be-destroyed storage unit according to the number of accesses; and a promoting module, configured to issue a to-be-destroyed prompt under the condition that the data storage unit belongs to a to-be-destroyed storage unit.

In some embodiments, the access number acquisition module is configured to periodically query last access time of the data storage unit; update a record of the number of accesses according to a change of the last access time of the data storage unit; and determine the number of accesses according to the record of the number of accesses.

In some embodiments, the access number acquisition module is configured to acquire, under the condition that the data storage unit is a data table, according to a time phase in which the data table lies, the number of accesses of the data table within a preset time interval corresponding to the time phase; wherein the data table is set with a lifecycle that is divided into a plurality of time phases.

In some embodiments, the access number acquisition module is configured to periodically acquire, under the condition that the data storage unit is a partition file, the number of accesses of the partition file within a preset time interval corresponding to a current cycle.

In some embodiments, the state determination module is configured to acquire, under the condition that the data storage unit is a data table, a first access number threshold corresponding to the time phase according to the time phase in which the data table lies; and under the condition that the number of accesses is less than or equal to the first access number threshold, determine that the data table belongs to a to-be-destroyed storage unit; wherein the first access number threshold corresponding to a different time phase is the same or different.

In some embodiments, the state determination module is configured to determine, under the condition that the data storage unit is a partition file and the number of accesses is less than or equal to a second access number threshold, that the partition file belongs to a to-be-destroyed storage unit.

In some embodiments, the apparatus further comprises: a storage migration module, configured to distribute the data table to a different storage device for storage, according to the number of accesses of the data table within the preset time interval corresponding to the time phase.

In some embodiments, the storage migration module is configured to compare the number of accesses of the data table within the preset time interval corresponding to the time phase with a plurality of access number thresholds corresponding to the time phase, to determine a data popularity level of the data table; and distribute the data table to a storage device with a performance corresponding to the data popularity level for storage, according to the data popularity level of the data table.

In some embodiments, the apparatus further comprises: a reconfiguration module, configured to reconfigure, under the condition that the data storage unit does not belong to a to-be-destroyed storage unit and its lifecycle reaches an end time point, the lifecycle.

According to still other embodiments of the present disclosure, there is provided a data storage management apparatus comprising: a memory; and a processor coupled to the memory, wherein the processor is configured to perform the data storage management method of any of the foregoing embodiments based on instructions stored in the memory.

According to further embodiments of the present disclosure, there is provided a computer-readable storage medium having a computer program stored thereon, wherein the program, when executed by a processor, implements the data storage management method of any of the foregoing embodiments.

According to the present disclosure, the number of accesses of a data storage unit in the big data cluster within a preset time interval corresponding to the data storage unit is automatically detected, to judge whether the data storage unit can be destroyed according to the number of accesses, and if the data storage unit can be destroyed, a to-be-destroyed prompt is issued. The method according to the present disclosure can automatically and effectively manage data storage in the big data cluster, and timely destroy the data storage unit no longer needed to release the storage space, which improves the data query efficiency and data storage management efficiency.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings described herein are used for providing a further understanding of the present disclosure and constitute a part of the present application, and the disclosed illustrative embodiments, together with the description thereof, serve to explain but not to improperly limit the present disclosure. In the drawings.

DETAILED DESCRIPTION

The technical solutions in the embodiments of the present disclosure will be described clearly and completely in conjunction with the accompanying drawings in the embodiments of the present disclosure, and it is obvious that the embodiments described are only some of the embodiments of the present disclosure, rather than all embodiments. The following description of at least one exemplary embodiment is merely illustrative in nature and is in no way intended to limit this disclosure, its applications, or uses. All other embodiments, which can be derived from the embodiments disclosed herein by one of ordinary skill in the art without making any creative effort, shall fall within the protection scope of the present disclosure.

The present disclosure provides a data storage management method, which is described below in conjunction with FIG. 1.

Figure 1:
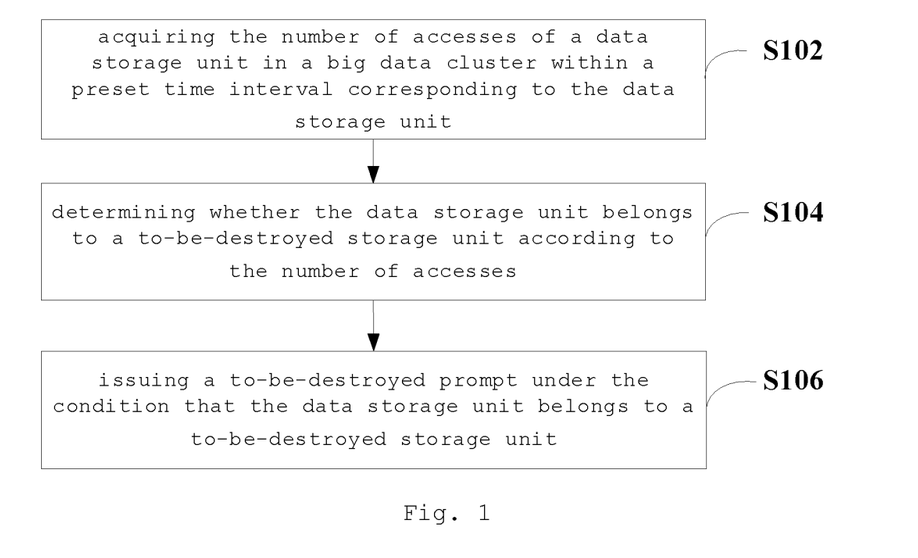
FIG. 1 illustrates a schematic flow diagram of a data storage management method according to some embodiments of the present disclosure.

FIG. 1 is a flow diagram of the data storage management method according to some embodiments of the present disclosure. As shown in FIG. 1, the method of the embodiments comprises: steps S102 to S106.

In step S102, the number of accesses of a data storage unit in a big data cluster within a preset time interval corresponding to the data storage unit is acquired.

In some embodiments, last access time of the data storage unit is periodically queried; a record of the number of accesses is updated according to a change of the last access time of the data storage unit; and the number of accesses within the corresponding preset time interval is determined according to the record of the number of accesses. For example, under the condition that data is stored in a Hive data warehouse, a database (e.g., the database is Mysql) of Hive metastore (metastore) can be polled once every preset cycle; and if LAST_ACCESS_TIME (last access time) in a table TBLS changes, the number of accesses is recorded according to the change of the LAST_ACCESS_TIME. The number of accesses can be cleared and recalculated at regular intervals. A command desc extended table_name in the Hive can be used for checking, and granularity of the checking can be set according to a parameter dfs.namenode.accesstime.precision, that is, a span of the preset cycle is set.

For example, a time phase in which a data storage unit lies is determined, and the number of accesses within a preset time interval corresponding to the time phase is acquired. In some embodiments, the data storage unit in the big data cluster or data warehouse is a data table, and the data table can be set with a lifecycle. The setting of the lifecycle can be performed when the data table is created. The lifecycle of the data table can indicate a period from its creation to destruction, a time span of the lifecycle can be set according to actual business needs, and lifecycles of different data tables can be different, for example, the lifecycle is set to be 3 years or 2 months, etc.

The lifecycle can be divided into a plurality of time phases, for example, the lifecycle is divided into a first time phase, a second time phase, a third time phase, a fourth time phase, and so on. Time spans of preset time intervals corresponding to different time phases can be the same or different, and the preset time intervals corresponding to the different time phases can be non-overlapped. The different time phases can be set according to changing phases of data popularity of the data table. For example, data popularity of the data table can be divided into different data popularity levels. For example, the data popularity levels comprise: online hot data, online warm data, offline cold data, to-be-destroyed data, etc.

Data popularity of a preset number of historical data tables corresponding to the business can be counted. According to the time span and time range in which these historical data tables last in an online hot data state, a first time phase (e.g., the first time phase is from the establishment of the data table to a third month thereafter) can be set. According to the time span and time range in which these historical data tables last in an online warm data state, a second time phase (e.g., the second time phase is from a fourth month after the establishment of the data table to a year) can be set; and so on, a third time phase (e.g., the third time phase is from the beginning of a second year after the establishment of the data table to the end of the second year) corresponds to offline cold data, and a fourth time phase (e.g., the fourth time phase is from the beginning of a third year after the establishment of the data table to the end of the lifecycle) corresponds to to-be-destroyed data. It is not that every data table will experience different data popularity levels, and time phases can be set based on a counting result of most data tables of a same business type.

In some embodiments, under the condition that the data storage unit is a data table, the number of accesses of the data table within a preset time interval corresponding to the time phase is acquired according to the time phase in which the data table lies. For example, if the data table currently lies in the third time phase, then the number of accesses in a period from the beginning of the second year after the establishment of the data table to the end of the second year is acquired.

In some embodiments, the data table can be divided into partition files for storage, i.e. the data storage unit can be a partition file. Under the condition that the data storage unit is a partition file, the number of accesses of the partition file within a preset time interval corresponding to a current cycle that is the time phase in which the data storage unit lies is periodically acquired. For example, the number of accesses of the partition file in last two years comprising the current cycle is acquired every one month. The number of accesses of the partition file can also be counted in the manner that the data table is divided into time phases and different time phases correspond to different preset time intervals.

In step S104, it is determined whether the data storage unit belongs to a to-be-destroyed storage unit according to the number of accesses.

With respect to different data storage units, time intervals for counting the number of accesses are different, and ways to determine whether a data storage unit belongs to a to-be-destroyed storage unit can also be different. In some embodiments, under the condition that the data storage unit is a data table, according to a time phase in which the data table lies, a first access number threshold corresponding to the time phase is acquired; and under the condition that the number of accesses is less than or equal to the first access number threshold, it is determined that the data table belongs to a to-be-destroyed storage unit. The first access number thresholds corresponding to different time phases are the same or different. For example, the first access number threshold corresponding to the first time phase is set to be a negative number, so that the data table cannot be determined as a to-be-destroyed storage unit in the first time phase, while the first access number threshold can be set to be 0 in the third time phase or the fourth time phase, then the data table can be determined as a to-be-destroyed storage unit under the condition that the number of accesses is 0 in the third time phase or the fourth time phase.

In some embodiments, under the condition that the data storage unit is a partition file and the number of accesses is less than or equal to a second access number threshold, it is determined that the partition file belongs to a to-be-destroyed storage unit. For example, if the number of accesses of the partition file in two years equals 0, the partition file belongs to a to-be-destroyed storage unit.

In some embodiments, in addition to the above solution that the data storage unit is set with a lifecycle divided into time phases, the data storage unit can also be set with different time phases for counting the number of accesses, wherein the different time phases correspond to different preset time intervals, for example, a fifth time phase is last three months from the current time, a sixth time phase is a period of last one year except the first time phase, and a seventh time phase is last two years, etc. Preset time intervals corresponding to different counting phases of the number of accesses can be overlapped. The different counting phases of the number of accesses can correspond to different third access number thresholds, and under the condition that the number of accesses is less than or equal to a third access number threshold, it is determined that the data table belongs to a to-be-destroyed storage unit.

In some embodiments, under the condition that the number of accesses of a data storage unit within a preset time interval corresponding to the data storage unit is less than or equal to a fourth access number threshold, it is determined that the data storage unit belongs to a to-be-destroyed storage unit. No matter which phase a data storage unit belongs to, as long as the number of accesses of the data storage unit within a preset time interval (for example, last two years) corresponding to the data storage unit is less than or equal to the fourth access number threshold, it is determined that the data storage unit belongs to a to-be-destroyed storage unit.

In step S106, under the condition that the data storage unit belongs to a to-be-destroyed storage unit, a to-be-destroyed prompt is issued.

The to-be-destroyed prompt is issued so that staff can be informed that there is a to-be-destroyed storage unit, and the staff can reconfirm whether the to-be-destroyed storage unit will be destroyed according to business needs. The to-be-destroyed storage unit can be displayed in an operation interface, or the to-be-destroyed prompt can be issued to the staff in the form of an e-mail, a short message and the like.

In some embodiments, under the condition that the data storage unit does not belong to a to-be-destroyed storage unit and the lifecycle of the data storage unit reaches an end time point, the lifecycle of the data storage unit is reconfigured. If the staff determine not to destroy the to-be-destroyed storage unit, the lifecycle of the data storage unit is reconfigured. The reconfigured lifecycle can be different from the original one. For example, with respect to the above data storage unit, every time a previous lifecycle is ended, a span of the lifecycle shortened with a certain step size is taken as a span of the next lifecycle.

The method of the above embodiments automatically detects the number of accesses of the data storage unit in the big data cluster within the preset time interval corresponding to the data storage unit is, to judge whether the data storage unit can be destroyed according to the number of accesses, and if the data storage unit can be destroyed, a to-be-destroyed prompt is issued. The method of the above embodiments can automatically and effectively manage data storage in the big data cluster, and timely destroy the data storage unit no longer needed to release the storage space, which improves the data query efficiency and data storage management efficiency.

In order to further improve the data query efficiency, data storage units with different data popularity can be stored separately, which is described below in conjunction with FIG. 2.

Figure 2:
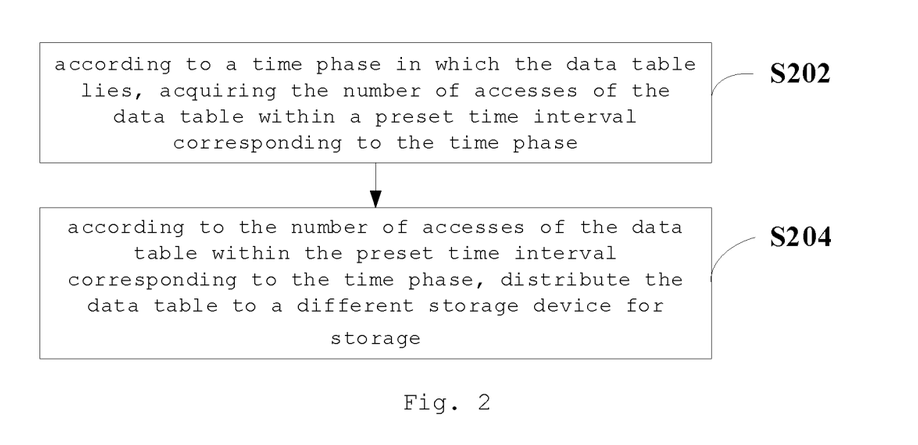
FIG. 2 illustrates a schematic flow diagram of a data storage management method according to other embodiments of the present disclosure.

FIG. 2 is a flow diagram of the data storage management method according to other embodiments of the present disclosure. As shown in FIG. 2, the method of the embodiments comprises: steps S202 to S204.

In step S202, according to a time phase in which the data table lies, the number of accesses of the data table within a preset time interval corresponding to the time phase is acquired.

In step S204, according to the number of accesses of the data table within the preset time interval corresponding to the time phase, the data table is distributed to a different storage device for storage.

For example, with reference to the foregoing embodiments, the data table is set with a lifecycle divided into different time phases. In some embodiments, the number of accesses of the data table within the preset time interval corresponding to the time phase is compared with a plurality of access number thresholds corresponding to the time phase, to determine a data popularity level of the data table; and the data table is distributed to a storage device with a performance corresponding to the data popularity level for storage, according to the data popularity level of the data table.

A time phase corresponds to a plurality of access number thresholds, and different access number thresholds correspond to different data popularity levels. For example, thresholds corresponding to a first time phase include 100, 50, 30, etc., and if the number of accesses of the data table in the first time phase exceeds 100, it is determined that the data table is in the highest data popularity level and is online hot data. If the number of accesses of the data table in the first time phase is less than 100 and more than 50, it is determined that the data table is in a second data popularity level and is online warm data, and so on. Different time phases can be set with different access number thresholds.

The higher data popularity level of the data table, the better performance (e.g., the higher the processing efficiency, the larger the storage space) of a distributed storage device (e.g., a rack). Different data tables are distributed to different storage devices according to access conditions, which can improve the efficiency of querying and accessing the data table with a larger number of accesses and enhance user experience.

For example, with reference to the foregoing embodiments, a data storage unit can also be set with a different time phase for counting the number of accesses. The number of accesses of a different time phase is separately counted, the number of accesses of the data storage unit within a preset time interval corresponding to each time phase is compared with a plurality of access number thresholds corresponding to the time phase, to determine a data popularity level of the data storage unit; and the data table is distributed to a storage device with a performance corresponding to the data popularity level for storage, according to the data popularity level of the data storage unit.

According to the method of the above embodiments, data storage units are distributed to storage devices with different performance for storage according to the data popularity level of the data storage units, and as data are migrated among different storage devices in the data lifecycle, data storage units with the larger number of accesses can be processed by storage devices with higher performance, which improves the efficiency of data access and query and enhances user experience.

The present disclosure further provides a data storage management apparatus, which is described below in conjunction with FIG. 3.

Figure 3:
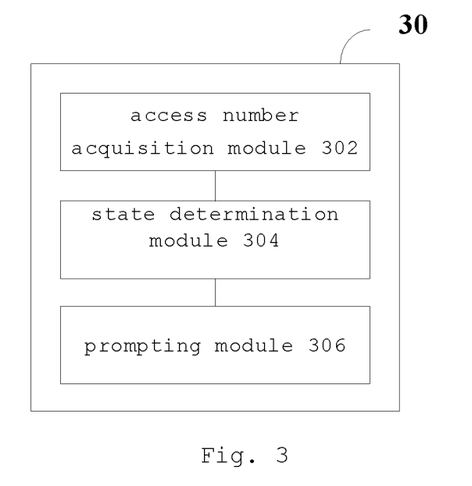
FIG. 3 illustrates a schematic structural diagram of a data storage management apparatus according to some embodiments of the present disclosure.

FIG. 3 is a structural diagram of the data storage management apparatus according to some embodiments of the present disclosure. As shown in FIG. 3, the apparatus 30 of the embodiments comprises: an access number acquisition module 302, a state determination module 304 and a prompting module 306.

The access number acquisition module 302 is configured to acquire the number of accesses of a data storage unit in a big data cluster within a preset time interval corresponding to the data storage unit, wherein the data storage unit comprises a data table or partition file.

In some embodiments, the access number acquisition module 302 is configured to periodically query last access time of the data storage unit; update a record of the number of accesses according to a change of the last access time of the data storage unit; and determine the number of accesses according to the record of the number of accesses.

In some embodiments, the access number acquisition module 302 is configured to acquire, under the condition that the data storage unit is a data table, according to a time phase in which the data table lies, the number of accesses of the data table within a preset time interval corresponding to the time phase, wherein the data table is set with a lifecycle that is divided into a plurality of time phases.

In some embodiments, the access number acquisition module 302 is configured to periodically acquire, under the condition that the data storage unit is a partition file, the number of accesses of the partition file within a preset time interval corresponding to a current cycle.

The state determination module 304 is configured to determine whether the data storage unit belongs to a to-be-destroyed storage unit according to the number of accesses.

In some embodiments, the state determination module 304 is configured to acquire, under the condition that the data storage unit is a data table, according to a time phase in which the data table lies, a first access number threshold corresponding to the time phase; and under the condition that the number of accesses is less than or equal to the first access number threshold, determine that the data table belongs to a to-be-destroyed storage unit; wherein the first access number threshold corresponding to a different time phase is the same or different.

In some embodiments, the state determination module 304 is configured to determine, under the condition that the data storage unit is a partition file and the number of accesses is less than or equal to a second access number threshold, that the partition file belongs to a to-be-destroyed storage unit.

The prompting module 306 is configured to issue a to-be-destroyed prompt under the condition that the data storage unit belongs to a to-be-destroyed storage unit.

Other embodiments of the data storage management apparatus of the present disclosure are described below in conjunction with FIG. 4.

Figure 4:
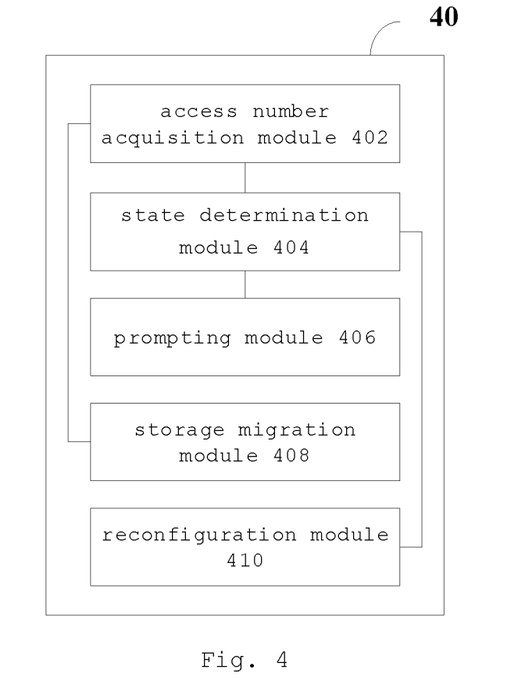
FIG. 4 illustrates a schematic structural diagram of a data storage management apparatus according to other embodiments of the present disclosure.

FIG. 4 is a structural diagram of the data storage management apparatus according to some embodiments of the present disclosure. As shown in FIG. 4, the apparatus 40 of the embodiments comprises: an access number acquisition module 402, a state determination module 404 and a prompting module 406, which have identical or similar functions with the access number acquisition module 302, the state determination module 304 and the prompting module 306, respectively; and the apparatus 40 further comprises: a storage migration module 408.

The storage migration module 408 is configured to distribute the data table to a different storage device for storage, according to the number of accesses of the data table within a preset time interval corresponding to the time phase.

In some embodiments, the storage migration module 408 is configured to compare the number of accesses of the data table within the preset time interval corresponding to the time phase with a plurality of access number thresholds corresponding to the time phase, to determine a data popularity level of the data table; and distribute the data table to a storage device with a performance corresponding to the data popularity level for storage, according to the data popularity level of the data table.

In some embodiments, the apparatus 40 further comprises: a reconfiguration module 410, configured to reconfigure, under the condition that the data storage unit does not belong to a to-be-destroyed storage unit and its lifecycle reaches an end time point, the lifecycle.

The data storage management apparatus in the embodiments of the present disclosure can be implemented by various computing devices or computer systems, which are described below in conjunction with FIGS. 5 and 6.

Figure 5:
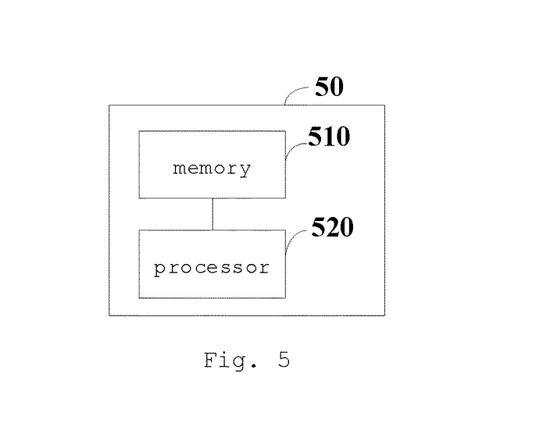
FIG. 5 illustrates a schematic structural diagram of a data storage management apparatus according to still other embodiments of the present disclosure.

FIG. 5 is a structural diagram of the data storage management apparatus according to some embodiments of the present disclosure. As shown in FIG. 5, the apparatus 50 of the embodiments comprises: a memory 510 and a processor 520 coupled to the memory 510, wherein the processor 520 is configured to perform the data storage management method in any of the embodiments of the present disclosure based on instructions stored in the memory 510.

The memory 510 herein may include, for example, system memory, fixed non-volatile storage media, and the like. The system memory is stored thereon, for example, an operating system, an application program, a Boot Loader, a database, and other programs.

Figure 6:
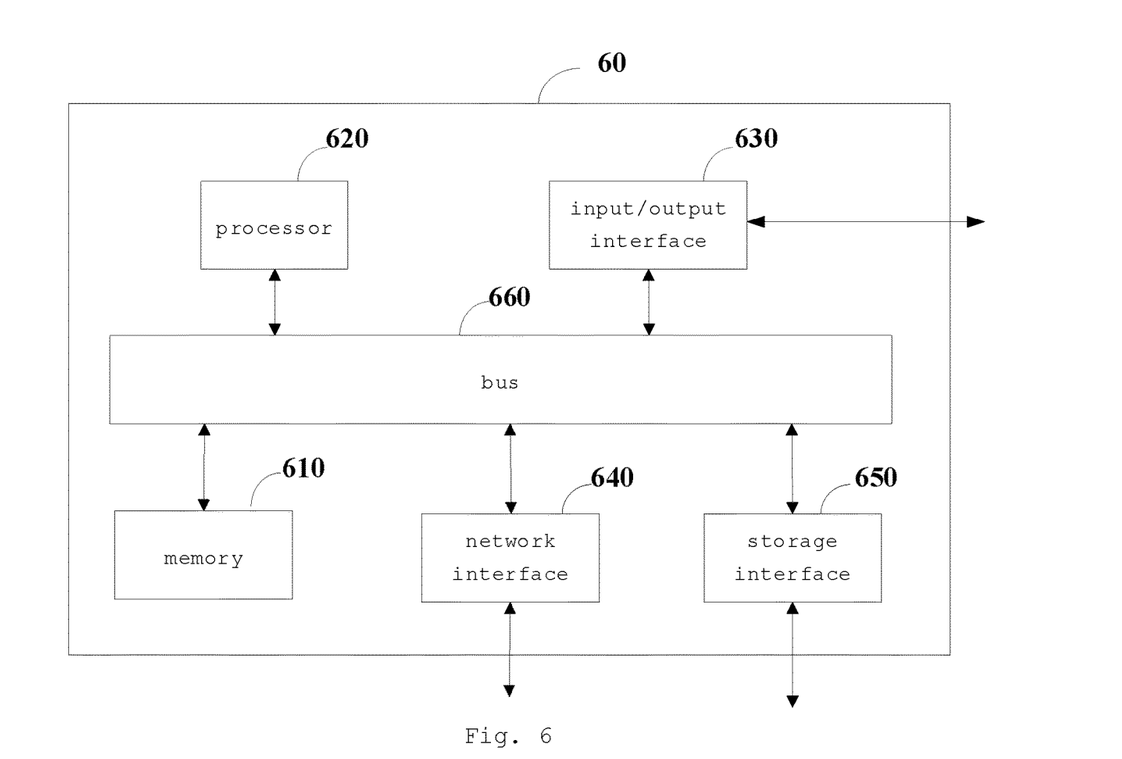
FIG. 6 illustrates a schematic structural diagram of a data storage management apparatus according to further embodiments of the present disclosure.

FIG. 6 is a structural diagram of the data storage management apparatus according to other embodiments of the present disclosure. As shown in FIG. 6, the apparatus 60 of the embodiments comprises: a memory 610 and a processor 620, which are similar to the memory 510 and the processor 520, respectively. The apparatus 60 can further comprise input/output interface 630, network interface 640, storage interface 650, etc. These interfaces 630, 640, 650, and the memory 610 and the processor 620 can be connected, for example, via a bus 660. The input/output interface 630 provides connection interfaces for input/output devices such as display, mouse, keyboard, and touch screen. The network interface 640 provides various networking devices with connection interfaces, which can be connected to, for example, database server or cloud storage server. The storage interfaces 650 provide connection interfaces for external storage devices such as SD card and U disk.

As will be appreciated by one skilled in the art, the embodiments of the present disclosure may be provided as a method, system, or computer program product. Accordingly, the present disclosure may take the form of an entire hardware embodiment, an entire software embodiment or an embodiment combining software and hardware aspects. Furthermore, the present disclosure may take the form of a computer program product implemented on one or more computer-usable non-transitory storage media (including, but not limited to, disk storage, CD-ROM, optical storage, and so forth) having computer-usable program codes embodied therein.

The present disclosure is described with reference to flow diagrams and/or block diagrams of the method, apparatus (system), and computer program product according to the embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which are executed by the processor of the computer or other programmable data processing apparatus, create means for implementing functions specified in one or more flows of a flow diagram and/or one or more blocks of a block diagram.

These computer program instructions may also be stored in a computer-readable memory guiding a computer or other programmable data processing apparatus to work in a particular way, such that the instructions stored in the computer-readable memory produce an article of manufacture including instruction means which implement function specified in one or more flows of a flow diagram and/or one or more blocks of a block diagram.

These computer program instructions may also be loaded onto a computer or other programmable data processing apparatus, such that a series of operational steps are performed on the computer or other programmable apparatus to produce a computer-implemented process, and thus the instructions, which are executed on the computer or other programmable apparatus, provide steps configured to implement functions specified in one or more flows of a flow diagram and/or one or more blocks of a block diagram.

The above is only the preferred embodiments of the present disclosure, but is not intended to limit the present disclosure, and any modification, equivalent substitution, improvement, etc., made within the spirit and principle of the present disclosure shall be contained in the protection scope of the present disclosure.

What is claimed is:

1. A data storage management method comprising:
  acquiring a number of accesses of a data storage unit in a big data cluster within a preset time interval corresponding to the data storage unit, wherein the data storage unit comprises a data table or partition file;
  determining whether the data storage unit belongs to a to-be-destroyed storage unit according to the number of accesses; and
  issuing a to-be-destroyed prompt under a condition that the data storage unit belongs to a to-be-destroyed storage unit,
  wherein the acquiring a number of accesses of a data storage unit in a big data cluster within a preset time interval corresponding to the data storage unit comprises:
  under a condition that the data storage unit is the data table, according to a time phase in which the data table lies, acquiring the number of accesses of the data table within a preset time interval corresponding to the time phase,
  wherein the data table is set with a lifecycle that is divided into a plurality of time phases, the time phases are set according to changing phases of data popularity of the data table in the lifecycle of a period from a creation to a destruction.

2. The data storage management method according to claim 1, wherein the acquiring the number of accesses of a data storage unit in a big data cluster within a preset time interval corresponding to the data storage unit comprises:
  periodically querying a last access time of the data storage unit;
  updating a record of the number of accesses according to a change of the last access time of the data storage unit; and
  determining the number of accesses according to the record of the number of accesses.

3. The data storage management method according to claim 1, wherein the acquiring the number of accesses of a data storage unit in a big data cluster within a preset time interval corresponding to the data storage unit comprises:
  under the condition that the data storage unit is a partition file, periodically acquiring the number of accesses of the partition file within a preset time interval corresponding to a current cycle.

4. The data storage management method according to claim 1, wherein the determining whether the data storage unit belongs to a to-be-destroyed storage unit according to the number of accesses comprises:
  under the condition that the data storage unit is a data table, acquiring a first access number threshold corresponding to the time phase according to the time phase in which the data table lies; and
  under the condition that the number of accesses is less than or equal to the first access number threshold, determining that the data table belongs to a to-be-destroyed storage unit, wherein the first access number threshold corresponding to a different time phase is the same or different.

5. The data storage management method according to claim 3, wherein the determining whether the data storage unit belongs to a to-be-destroyed storage unit according to the number of accesses comprises:
  under the condition that the data storage unit is a partition file and the number of accesses is less than or equal to a second access number threshold, determining that the partition file belongs to a to-be-destroyed storage unit.

6. The data storage management method according to claim 1, further comprising:
  according to the number of accesses of the data table within the preset time interval corresponding to the time phase, distributing the data table to a different storage device for storage.

7. The data storage management method according to claim 6, wherein the distributing the data storage unit to a different storage device for storage comprises:
  comparing the number of accesses of the data table within the preset time interval corresponding to the time phase with a plurality of access number thresholds corresponding to the time phase, to determine a data popularity level of the data table; and
  distributing the data table to a storage device with a performance corresponding to the data popularity level for storage, according to the data popularity level of the data table.

8. The data storage management method according to claim 1, further comprising:
  under the condition that the data storage unit does not belong to a to-be-destroyed storage unit and a lifecycle thereof reaches an end time point, reconfiguring the lifecycle.

9. A data storage management apparatus comprising:
  a memory; and
  a processor coupled to the memory, wherein the processor is configured to perform a data storage management method based on instructions stored in the memory,
  wherein the data storage management method comprises:
  acquiring a number of accesses of a data storage unit in a big data cluster within a preset time interval corresponding to the data storage unit, wherein the data storage unit comprises a data table or partition file;
  determining whether the data storage unit belongs to a to-be-destroyed storage unit according to the number of accesses; and
  issuing a to-be-destroyed prompt under a condition that the data storage unit belongs to a to-be-destroyed storage unit;
  wherein the acquiring a number of accesses of a data storage unit in a big data cluster within a preset time interval corresponding to the data storage unit comprises:
  under a condition that the data storage unit is the data table, according to a time phase in which the data table lies, acquiring the number of accesses of the data table within a preset time interval corresponding to the time phase, wherein the data table is set with a lifecycle that is divided into a plurality of time phases, the time phases are set according to changing phases of data popularity of the data table in the lifecycle of a period from a creation to a destruction.

10. A non-transitory computer-readable storage medium having a computer program stored thereon, wherein the program, when executed by a processor, implements steps of the method comprising:

acquiring a number of accesses of a data storage unit in a big data cluster within a preset time interval corresponding to the data storage unit, wherein the data storage unit comprises a data table or partition file;

determining whether the data storage unit belongs to a to-be-destroyed storage unit according to the number of accesses; and issuing a to-be-destroyed prompt under a condition that the data storage unit belongs to a to-be-destroyed storage unit, wherein the acquiring a number of accesses of a data storage unit in a big data cluster within a preset time interval corresponding to the data storage unit comprises:

under a condition that the data storage unit is the data table, according to a time phase in which the data table lies, acquiring the number of accesses of the data table within a preset time interval corresponding to the time phase, wherein the data table is set with a lifecycle that is divided into a plurality of time phases, the time phases are set according to changing phases of data popularity of the data table in the lifecycle of a period from a creation to a destruction.

11. The data storage management apparatus according to claim 9, wherein the processor is configured to periodically query last access time of the data storage unit; update a record of the number of accesses according to a change of the last access time of the data storage unit; and determine the number of accesses according to the record of the number of accesses.

12. The data storage management apparatus according to claim 9, wherein the processor is configured to periodically acquire, under the condition that the data storage unit is a partition file, the number of accesses of the partition file within a preset time interval corresponding to a current cycle.

13. The data storage management apparatus according to claim 10, wherein the processor is configured to:

under the condition that the data storage unit is a data table, acquire a first access number threshold corresponding to the time phase according to the time phase in which the data table lies; and under the condition that the number of accesses is less than or equal to the first access number threshold, determine that the data table belongs to a to-be-destroyed storage unit, wherein the first access number threshold corresponding to a different time phase is the same or different.

14. The data storage management apparatus according to claim 12, wherein the processor is configured to determine, under the condition that the data storage unit is a partition file and the number of accesses is less than or equal to a second access number threshold, that the partition file belongs to a to-be-destroyed storage unit.

15. The data storage management apparatus according to claim 10, wherein the processor is configured to distribute the data table to a different storage device for storage, according to the number of accesses of the data table within the preset time interval corresponding to the time phase.

16. The data storage management apparatus according to claim 15, wherein the processor is configured to:

compare the number of accesses of the data table within the preset time interval corresponding to the time phase with a plurality of access number thresholds corresponding to the time phase, to determine a data popularity level of the data table; and distribute the data table to a storage device with a performance corresponding to the data popularity level for storage, according to the data popularity level of the data table.

17. The data storage management apparatus according to claim 9, wherein the processor is configured to reconfigure, under the condition that the data storage unit does not belong to a to-be-destroyed storage unit and its lifecycle reaches an end time point, the lifecycle.

* * * * *